Jan. 5, 1965  G. R. JOBE  3,164,402
SHAFT KEY
Filed Dec. 11, 1962

INVENTOR
G. R. JOBE
BY
Walter M. Hill
ATTORNEY

United States Patent Office 3,164,402
Patented Jan. 5, 1965

3,164,402
SHAFT KEY
Garland R. Jobe, Greensboro, N.C., assignor to Bell Telephone Laboratories, Incorporated, New York, N.Y., a corporation of New York
Filed Dec. 11, 1962, Ser. No. 243,905
2 Claims. (Cl. 287—52.05)

This invention relates to an article of manufacture and more particularly to an improved key structure for securing a hub to a shaft.

Conventional methods of securing the hubs of gears, pulleys, sprockets, levers and like members to their shafts generally employ some kind of key to prevent both rotary and axial motion of the hub with reference to its shaft. For light loads, taper pins and even cotter keys are sometimes used to perform both of these functions. While the taper pins and cotter keys are very simple, they are not suited for the transmission of heavy torque loads and resort must be made to other types of keys such as the Woodruff key or a type known as the sunken key. The machining required with the use of either of these keys to secure against axial motion becomes expensive for small machines and appliances. It would be of considerable economic advantage to materially reduce the number of these machining operations. In many cases the hub must also bear a thrust load so that a thrust bearing must be provided between the hub and the machine frame. It would, therefore, be of further economic advantage if a simple unitary key structure could provide all three of these functions, i.e., the two functions of securing the hub against both axial and rotary motion as well as to provide a thrust bearing.

An object of this invention is to secure a hub to its shaft with a minimum of machining operations.

An additional object of this invention is to secure a hub against both rotary and axial motion with reference to its shaft as well as to provide a thrust bearing at one end of the hub.

The foregoing objects are achieved by the article of manufacture of this invention which comprises essentially a thrust bearing washer having integral therewith at least one rod which is so positioned perpendicularly to its surface that each rod will lie against the shaft and in a key-way in the hub. Each of the rods is longer than the hub so that its end may protrude from the hub and be bent over to grip the hub between its thrust washer and its bent end. Each rod also has a laterally protruding arcuate portion, resembling a Woodruff key, which is to be inserted in a complementary key-seat in the shaft. In use, the shaft is inserted through the washer and each of the arcuate portions is inserted in its seat in the shaft. The hub is pushed on its shaft against the washer with the rods in the key-ways and the rod ends are bent over.

The invention may be better understood by referring to the accompanying drawings, in which.

Figure 1:
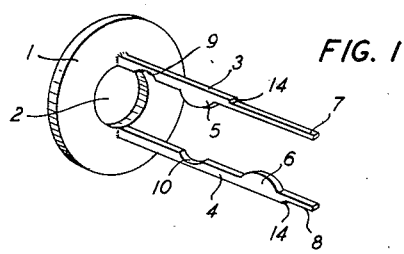
FIG. 1 is illustrative of a preferred embodiment of the invention.

FIG. 1 discloses a thrust washer 1 made of suitable bearing material compatible with the machine parts with which it is to be used. This washer has a centrally located hole 2 which is of such diameter as to give only a slight clearance to the outside diameter of the shaft with which it is intended to be used. Integral with a surface of the thrust washer 1 are two rods 3 and 4 extending perpendicularly to that surface for a distance greater than the length of the hub so that the outer ends thereof may be bent over against the hub as will be hereinafter more particularly described. Arcuate portions 5 and 6 protrude inwardly from the inside surfaces of these rods so that they may extend radially into a shaft when in use. It will be recognized that these arcuate portions 5 and 6 are substantially indentical with a conventional Woodruff key. The outer portions 7 and 8 of these rods are of reduced section beginning at the points 14 to facilitate their being bent over the end of the hub. Also between the arcuate portions 5 and 6 and washer 1 will be found reduced sections 9 and 10 which permit the rods to be readily bent outwardly as illustrated more clearly in FIG. 2 to facilitate assembly on the shaft. If only one rod is used the rod will not have to be bent so that this reduced section need not be provided.

Figure 2:
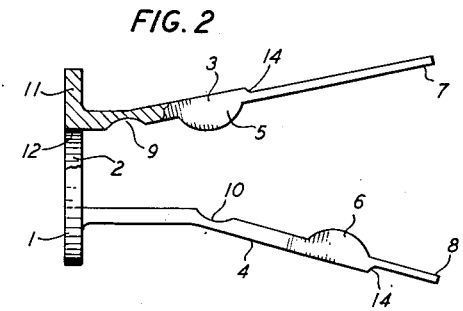
FIG. 2 is a side view of the structure of FIG. 1 to show the position of the rods prior to assembly on a shaft.

FIG. 2 is a side view of the embodiment shown in FIG. 1 to show the positions of the two rods 3 and 4, bent at their reduced sections 9 and 10, respectively, so as to enable their being assembled on a shaft. A portion of thrust washer 1 has been cut away to reveal that it is preferably of annular form having a rectangular cross section. The inner surface of rod 3 is also preferably made flush with the inner surface 12 of the hole 2. This is also true of the upper surface of rod 4.

Figure 3:
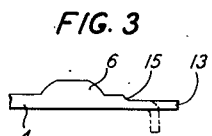
FIG. 3 is illustrative of a modification of the rod.

FIG. 3 is a fragmentary view of rod 4 of FIGS. 1 and 2 showing a modification in the location of the reduced section of the outer portion of the rod. It will be noted, in comparing FIGS. 2 and 3, that rod 4 in FIG. 2 has its outer end reduced beginning at a point 14 from its lower surface whereas in FIG. 3 the reduction is made at point 15 along the upper surface. The effect to these two alternative ways of reducing the ends of the rods is illustrated in FIGS. 4 and 5, respectively.

Figure 4:
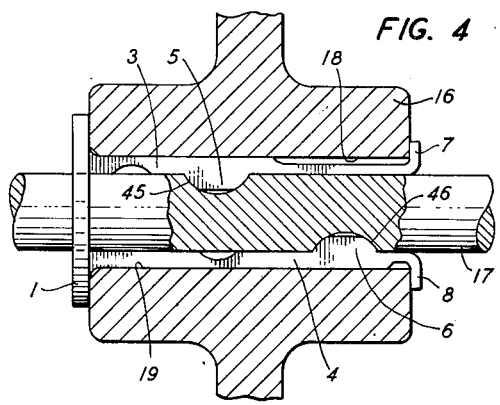
FIGS. 4 and 5 illustrate the manner in which the invention may be utilized in securing a hub to a shaft.
Figure 5:
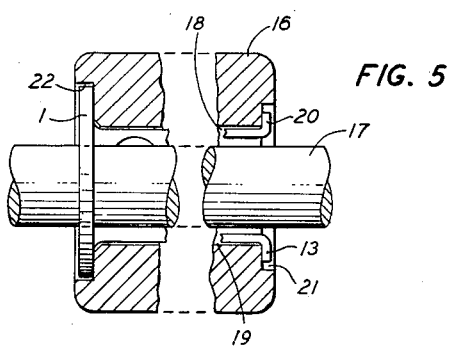

FIG. 4 shows the manner in which this invention may be utilized to secure a hub 16 to a shaft 17. Except for the milling of the two key-seats 45 and 46, no machining of the shaft is necessary. These two cuts are made in the same manner as for cutting the key-seats for conventional Woodruff keys. The only requirement is that they be positioned the proper distance apart on opposite sides of the shaft to accommodate the positions of the arcuate key portions 5 and 6. It will be noted that the two rods 3 and 4 are located in conventional key-ways 18 and 19 cut in diametrically opposite sides inside the hub 16. In assembly, a unit such as shown in FIG. 2 is passed over the shaft 17 and the two arcuate portions 5 and 6 are pressed down into their key-seats 45 and 46, respectively. The hub is then slid over the shaft and key structure from the right until the left end of the hub rests firmly against the righ surface of the thrust washer 1. The outer reduced ends of the rods 7 and 8 are then bent over the right end of the hub to securely grip the ends of the hub between these bends and thrust washer 1. It will now become apparent that, since the arcuate portions 5 and 6 cannot move axially on the shaft 17, the hub is secured in the axial direction. The hub is also secured against rotary motion by reason of the arcuate portions 5 and 6 in their key-seats and rods 3 and 4 in the key-ways of the hub.

The key structure disclosed in FIG. 4 is of the type shown in FIG. 2 so that the reduced ends of the rods will be contiguous with the outer surface of the shaft 17 when in use. The modification shown in FIG. 3 is illustrated in FIG. 5 where the reduced ends of the rods will be contiguous with the inner surface of the key-ways 18 and 19. In this way the ends of the rods may be more sharply bent over against the end of the hub. Except for this modification and the addition of recesses 21 and 22 at the ends of the hub, FIG. 5 should be considered as a fragmentary portion of the cross section shown in FIG. 4. Recesses 21 and 22 at the ends of the hub permit the washer 1 as well as the bent over ends 13 and 20 to be below the end surfaces of the hub. The left end of the hub 16 in FIG. 5 has been machined to show the recess 22 of a depth slightly greater than the thickness of washer 1 and the right side of the hub has a similar recess 21 to clear the bent ends 13 and 20.

While the invention has been illustrated and described with reference to particular embodiments showing two rods, it is obvious that a workable embodiment for light loads can be obtained by using only one rod. Moreover, more than two rods can be used for heavier loads, these preferably being symmetrically disposed on the surface of washer 1 in the same manner as illustrated for rods 3 and 4 in FIG. 1. If the hub is of sufficient length, more than one arcuate portion, such as portion 5, may be used on any or all of the rods. Although arcaute portions 5 and 6 are preferably made to have the general configuration of a standard Woodruff key, it will be quite evident that these protuberances need not be of arcuate shape and could, instead, be of another shape extending radially toward the center of the shaft with which the key is to be used. In any case, the cavities or key-seats, corresponding with cavities 45 and 46 in FIG. 4, must have shapes complementary to the shapes of the protuberances selected. These and other simple modifications of the invention may be apparent to those skilled in the art and should be considered within the scope of the invention.

What is claimed is:

1. A key for securing a hub to a shaft, said key comprising an annular member having a substantially rectangular cross section and a hole to receive said shaft, a plurality of rods having one end on each rod integral with said member and extending substantially perpendicular thereto with one lateral surface flush with the inner periphery of said hole, the free end of each rod having a reduced cross section for a sufficient distance to facilitate bending it against a face of said hub, and an arcuate portion protruding from said lateral surface on each rod intermediate the ends of each rod at a distance from said annular member, said distance being different for each rod, a portion of each rod between said annular member and said arcuate portion being of reduced cross section to facilitate bending said rod.

2. A unitary shaft key, thrust bearing and hub retainer comprising an annular thrust bearing member having a central opening to receive a shaft, a plurality of rods, each having one end integral with said bearing and extending substantially perpendicular to the plane defined by a lateral surface of said bearing, the other end of each rod having a reduced cross section extending over a substantial length thereof to facilitate bending it against a face of said hub, a surface of each rod being flush with the inner periphery of said central opening and parallel to the longitudinal axis thereof, and a protuberance extending radially inwardly from said flush surface of each rod and intermediate the ends of each rod, each protuberance being at a distance from said bearing different from that distance for the protuberances on all the other of said plurality of rods, a portion of each rod between said bearing and its protuberance being of reduced cross section to facilitate bending said rod.

References Cited in the file of this patent

UNITED STATES PATENTS

| | | |
|---|---|---|
| 330,266 | Shehan | Nov. 10, 1885 |
| 394,537 | Griffin | Dec. 11, 1888 |
| 827,023 | Knoener | July 24, 1906 |
| 1,169,408 | Larson | Jan. 25, 1916 |
| 1,175,100 | Werner | Mar. 14, 1916 |
| 1,177,780 | Kessel | Apr. 4, 1916 |
| 1,803,136 | Schulze | Apr. 28, 1931 |
| 2,563,166 | Gardner | Aug. 7, 1951 |